(12) United States Patent
Mericas

(10) Patent No.: US 6,895,399 B2
(45) Date of Patent: May 17, 2005

(54) METHOD, SYSTEM, AND COMPUTER PROGRAM PRODUCT FOR DYNAMICALLY ALLOCATING RESOURCES

(75) Inventor: Alexander Erik Mericas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 09/951,959

(22) Filed: Sep. 13, 2001

(65) Prior Publication Data

US 2003/0050905 A1 Mar. 13, 2003

(51) Int. Cl.[7] ............................................. G06F 17/00
(52) U.S. Cl. ............................ 706/59; 713/1; 709/104
(58) Field of Search .............................. 706/59; 713/1; 709/104

(56) References Cited

U.S. PATENT DOCUMENTS

| 6,763,454 B2 | * | 7/2004 | Wilson et al. ................. 713/1 |
| 2002/0165963 A1 | * | 11/2002 | Baxley et al. ............. 709/226 |
| 2003/0041088 A1 | * | 2/2003 | Wilson et al. ............. 709/104 |

* cited by examiner

*Primary Examiner*—George Davis
(74) *Attorney, Agent, or Firm*—Duke W. Yee; Mark E. McBurney; Lisa L. B. Yociss

(57) ABSTRACT

A data processing system, method, and product are disclosed for dynamically allocating resources for multiple, different types of events that occur within a microprocessor. Multiple, different unallocated resources are provided. One of these unallocated resources are allocated only in response to a first occurrence of an event that is one of the different types of events. Thus, resources remain unallocated until a first occurrence of events for which resources are then allocated.

45 Claims, 3 Drawing Sheets

METHOD, SYSTEM, AND COMPUTER PROGRAM PRODUCT FOR DYNAMICALLY ALLOCATING RESOURCES

BACKGROUND OF THE INVENTION

1. Technical Field

The present invention relates generally to the field of data processing systems and, more specifically to a computer system, method, and product for dynamically allocating resources within a microprocessor.

2. Description of Related Art

Microprocessors include many different types of resources, such as memory, registers, counters, execution units, and other resources. These resources can be allocated to processes. Some of these resources are dedicated to specific types of processes while others are general purpose resources available for any process.

One process requiring the available of a resource is the performance monitoring of the microprocessor itself. Modern microprocessors typically contain specialized logic to monitor performance related events within the processor. These events include frequently occurring events such as processor cycles, dispatching of instructions, and completion of instructions. These events also includes more rarely occurring events such as flush or stall operations.

Within the performance monitor are one or more performance monitor counters. The performance monitor counters are used to count the number of particular types of events that occur during a performance test. In known systems there is a one-to-one correspondence between an event type and the counter allocated to count events of that event type, i.e. a counter will be allocated to count events of only one type during a performance test. The number of different types of events that might need to be monitored is almost always greater than the number of available counters.

In many cases, the events to be monitored occur only very rarely. For these very rare events, a counter must be allocated that might never be used. By requiring a dedicated counter for each type of event, the total number of events that may be monitored is limited by the number of performance counters.

Therefore, a need exists for a method, system, and product for dynamically allocating resources so that a resource is allocated only for those processes that actually need a resource.

SUMMARY OF THE INVENTION

A data processing system, method, and product are disclosed for dynamically allocating resources for multiple, different types of events that occur within a microprocessor. Multiple, different unallocated resources are provided. One of these unallocated resources are allocated only in response to a first occurrence of an event that is one of the different types of events. Thus, resources remain unallocated until a first occurrence of events for which resources are then allocated.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The invention is preferably realized using a well-known computing platform, such as an IBM RS/6000 server running the IBM AIX operating system. However, it may be realized in other popular computer system platforms, such as an IBM personal computer running the Microsoft Windows operating system or a Sun Microsystems workstation running operating systems such as UNIX or LINUX, without departing from the spirit and scope of the invention.

The present invention is a data processing system, method, and computer program product for dynamically allocating resources for multiple, different types of events that occur within a microprocessor. Resources, such as counters, remain unallocated until a first occurrence of particular types of events. When an event occurs, if that event is one of the particular types of events, a determination is made as to whether or not a counter has already been allocated to count that type of event. If a counter has already been allocated, the allocated counter is incremented. If a counter has not already been allocated, a counter is first allocated to count that type of event, and the counter is then increment.

A counter allocation list is generated. The list includes a plurality of fields. The first field indicates the number of counters that are associated with the list and available to be allocated. The next fields are each associated with a different one of the counters. A list of event identifiers are also stored in the counter allocation list. A delimiter is added to the end of the list. In this manner, the list length may vary.

When a particular counter is allocated for a particular event, an identifier that identifies that particular event is stored in the field associated with that particular counter.

Figure 1:
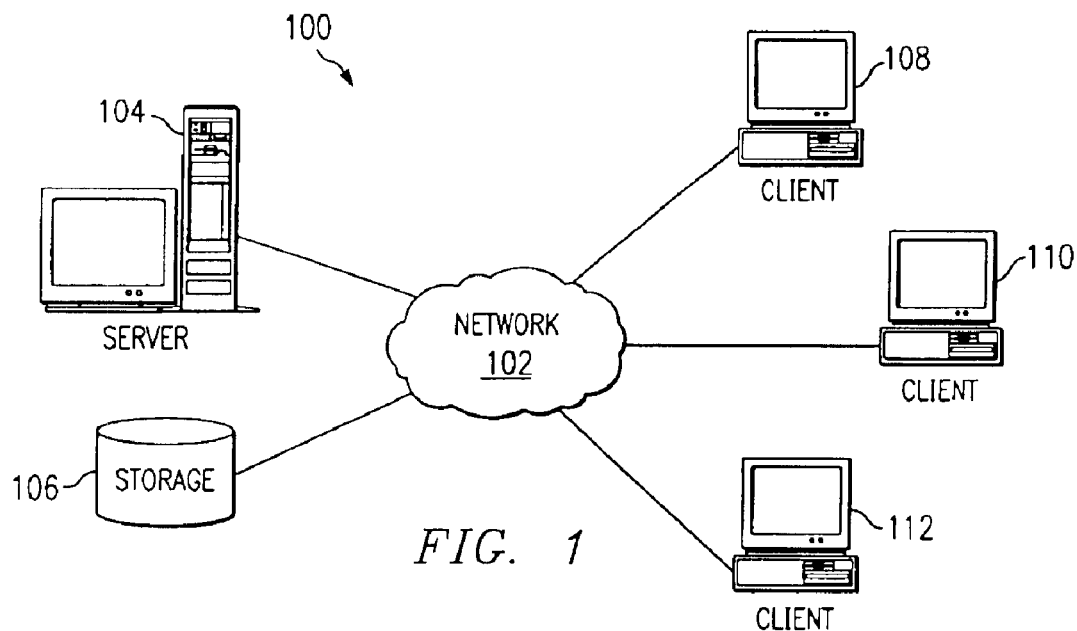
FIG. 1 is a pictorial representation which depicts a data processing system in which the present invention may be implemented in accordance with a preferred embodiment of the present invention.

FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. Network 102 may include permanent connections, such as wire or fiber optic cables, or temporary connections made through telephone connections. The communications network 102 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 104 without departing from the scope of the present invention. Moreover, as used herein, communications include those enabled by wired or wireless technology.

Clients 108, 110, and 112 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
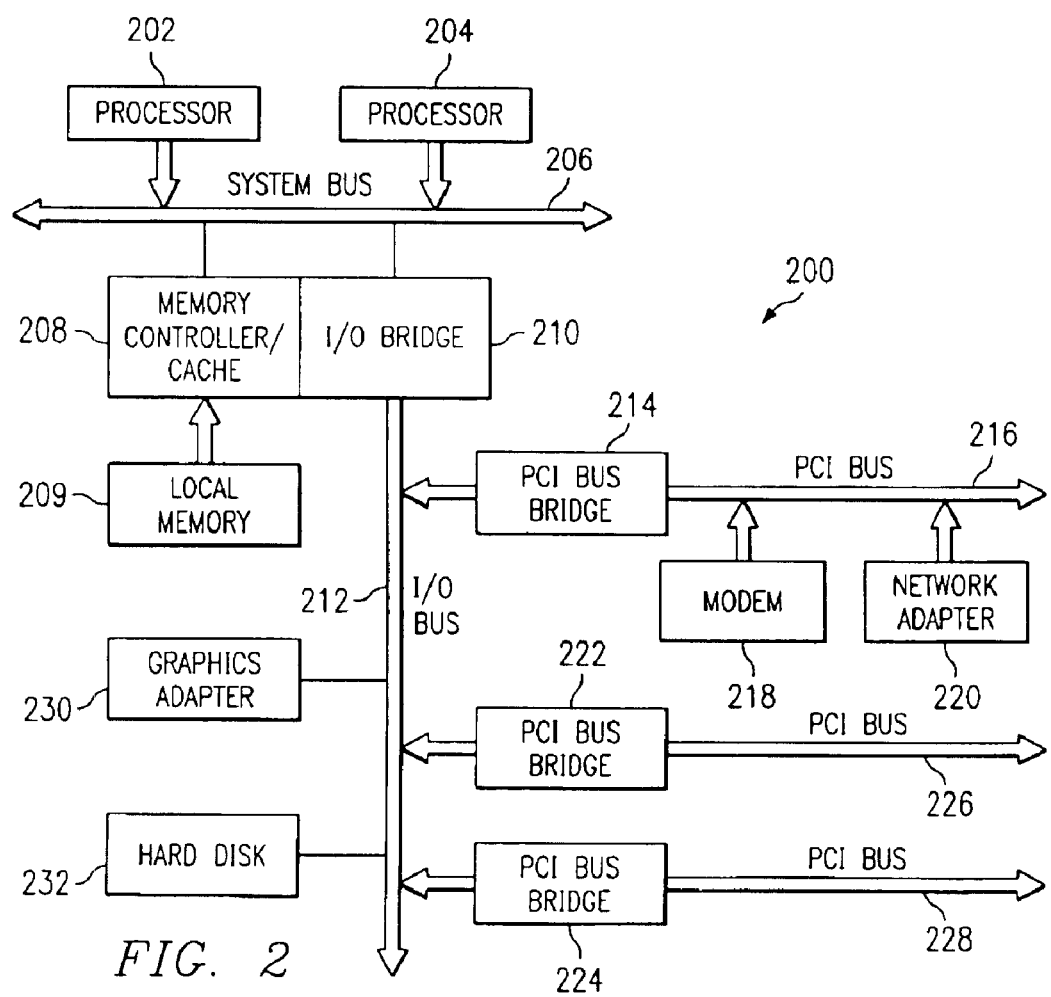
FIG. 2 illustrates a block diagram of a computer system which may be utilized as a server computer system in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. One or more of the processors include a performance monitor along with performance monitor counters. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
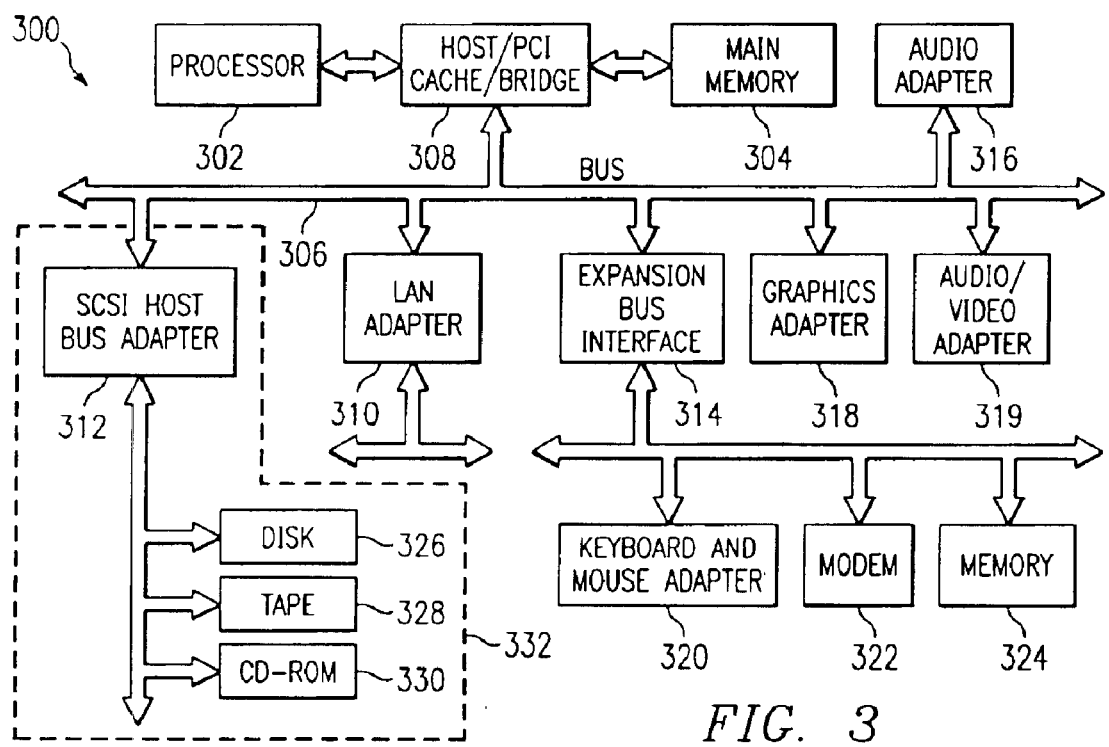
FIG. 3 depicts a block diagram of a computer system which may be utilized as a client computer system in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Each Web page may contain text, graphics, images, sound, multimedia files, links to other Web pages, and any other type of electronic information. The server computer system stores code in an HTML file which is used by a client's Web browser in order to build the page. When the user requests a particular page, the user types in the page URL. This HTML file is then returned to the browser. The HTML file tells the browser where to find the necessary components of the page, such as text files, image files, etc., as well as how to build the page. The flowcharts below describe the process used to obtain and display each component of a Web page.

Figure 4:
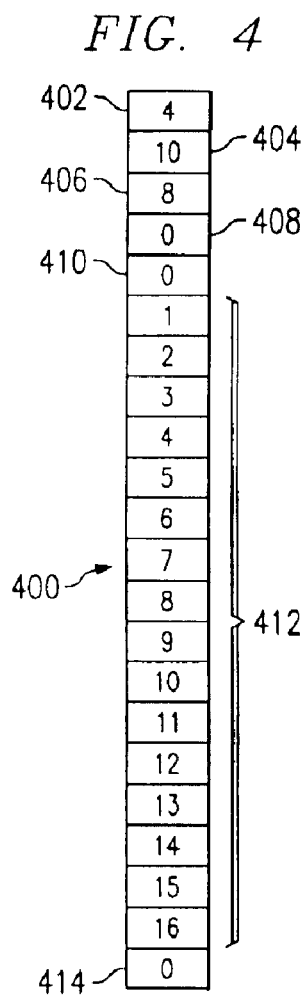
FIG. 4 is a block diagram of a counter allocation list in accordance with the present invention.

FIG. 4 is a block diagram of a counter allocation list 400 in accordance with the present invention. Counter allocation list 400 includes a list of event types that are to be counted, a field for each counter associated with the list in which an event identifier may be stored, and a delimiter to indicate the end of the list. A new list is generated each time the performance of the microprocessor is tested. The length of the list can vary from one test to the next. For example, four counters may be associated with the list to count up to four different types of events during one test, while ten counters may be associated with the list to count up to ten different types of events during a different test.

In the list example depicted in FIG. 4, four counters are associated with the list to count up to four different types of events. Sixteen different events are identified. Counter allocation list 400 includes 22 different fields. The first field, field 402, is used to indicate the number of counters that are associated with list 400. Field 402 is unnecessary once it is known in which data processing system the present invention is to be used. In practice, processors have a fixed, known number of counters. Once the data processing system is known, the number of counters will be fixed and known. The number stored in field 402 is the number of counters that are associated with the list and that may be allocated.

The next fields in the list are the counter fields that indicate whether the counter associated with the field has been allocated to a particular type of event. For example, since field 402 indicates that four counters are associated with list 400, the next four fields, fields 404, 406, 408, and 410, are each associated with a different counter. Field 404 indicates that the counter associated with this field has been allocated to count events that are event type 10. Field 406 indicates that the counter associated with this field has been allocated to count events that are event type 8. Fields 408 and 410 contain a "0", and thus indicate that the counters associated with these fields have not yet been allocated. These counters could be allocated to count events that are any of the remaining event types.

Fields 412 include a list of the event types that may be counted. Each field includes an identifier that identifies a particular type of event. For example, events that are event type "1" may be processor cycles. Each time an instruction is dispatched may be event type "2". Other event types include the completion of an instruction, or more rarely, flush or stall events.

A "0" is stored in field 414 in list 400 as a delimiter to indicate the end of the list. By including a delimiter, the length of each list may vary. List 400, as depicted, includes 22 fields. Another list could be generated which included 10 fields, 50 fields, or any other number of fields greater than four.

Figure 5:
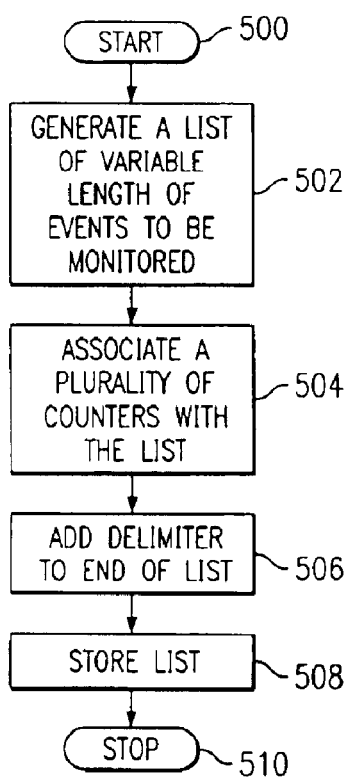
FIG. 5 depicts a high level flow chart which illustrates generating and storing a counter allocation list in accordance with the present invention.

FIG. 5 depicts a high level flow chart which illustrates generating and storing a counter allocation list in accordance with the present invention. The process starts as depicted by block 500 and thereafter passes to block 502 which illustrates generating a list of events that are to be monitored. The length of the list can vary from one test to the next to accommodate a varying number of events. Thereafter, block 504 depicts the association of a plurality of counters with the list. Next, block 506 illustrates adding a delimiter to the end of the list. Block 508, then, depicts storing the list. The list can be stored in a memory location that is accessible by the performance monitor and the software that is running the processor. The process then terminates as illustrated by block 510.

Figure 6:
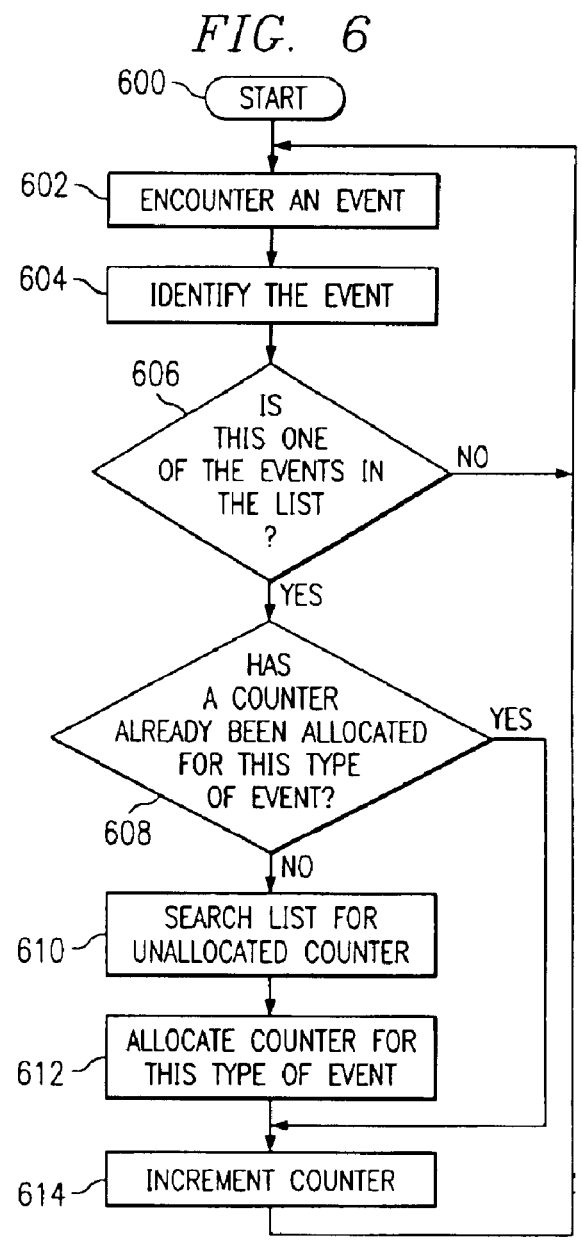
FIG. 6 illustrates a high level flow chart which depicts dynamically allocating counters in response to encountering a particular event in accordance with the present invention.

FIG. 6 illustrates a high level flow chart which depicts dynamically allocating counters in response to encountering a particular event in accordance with the present invention. The process starts as depicted by block 600 and thereafter passes to block 602 which illustrates the performance monitor encountering an event. Next, block 604 depicts the identification of the event. Block 606, then, illustrates a determination of whether or not this type of event is one of the types of events included in the event list. If a determination is made that this type of event is not one of the types of events included in the event list, the process passes back to block 602.

Referring again to block 606, if a determination is made that this type of event is one of the types of events included in the event list, the process passes to block 608 which depicts a determination of whether or not a counter has already been dynamically allocated for this type of event. If a determination is made that a counter has already been dynamically allocated for this type of event, the process passes to block 614. Referring again to block 608, if a determination is made that a counter has not already been dynamically allocated for this type of event, the process passes to block 610.

Block 610, then, illustrates searching the list for and locating an unallocated counter. If all of the counters have already been allocated, this type of event will not be able to be monitored. Next, block 612 depicts allocating the located counter for this type of event. Next, block 614 illustrates incrementing the counter. The process then passes back to block 602.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for dynamically allocating resources for a plurality of different types of events that occur within a microprocessor, said method comprising the steps of:
   providing a plurality of unallocated resources; and
   allocating one of said plurality of unallocated resources only in response to a first occurrence of an event that is one of said plurality of different types of events, wherein resources remain unallocated until a first occurrence of events for which resources are then allocated.

2. The method according to claim 1, further comprising the steps of:
   encountering an event;
   determining if said event is one of said plurality of different types of events;
   determining if one of said plurality of unallocated resources has already been allocated for said one of said plurality of different types of events; and
   in response to a determination that one of said unallocated resources has not already been allocated for said one of said plurality of different types of events, allocating one of said plurality of unallocated resources for said one of said plurality of different types of events.

3. The method according to claim 2, further comprising the step of in response to a determination that one of said unallocated resources has already been allocated for said one of said plurality of different types of events, utilizing one of said plurality of resources that has already been allocated for said one of said plurality of different types of events.

4. The method according to claim 1, further comprising the steps of:
   generating a list of ones of said plurality of different types of events;
   associating a plurality of unallocated resources with said list; and
   dynamically allocating ones of said plurality of unallocated resources for said ones of said plurality of different types of events in response to a first occurrence of an event that is one of said plurality of different types of events.

5. The method according to claim 4, further comprising the step of varying a length of said list according to a total number of said associated plurality of unallocated resources and a total number of said plurality of different types of events.

6. The method according to claim 5, further comprising the step of adding a delimiter as a last field in said list to indicate an end of said list.

7. The method according to claim 4, further comprising the step of including a quantity field in said list, said quantity field including an indication of a total number of said plurality of unallocated resources that are associated with said list.

8. The method according to claim 4, further comprising the step of including a plurality of fields in said list, each one of said plurality of fields being associated with a different one of said plurality of unallocated resources that are associated with said list, a total number of said plurality of fields being equal to a total number of said plurality of unallocated resources that are associated with said list.

9. The method according to claim 8, further comprising the step of storing an identifier in a field associated with one of said plurality of resources when said one of said plurality of resources is allocated, said identifier indicating one of said plurality of events for which said one of said plurality of resources is allocated.

10. The method according to claim 4, further comprising the step of including a plurality of different event indicators in said list, each one of said plurality of different event indicators indicating a different one of said plurality of events.

11. The method according to claim 4, further comprising the step of storing said list.

12. The method according to claim 1, further comprising the steps of:
   providing a plurality of unallocated counters; and
   allocating one of said plurality of unallocated counters only in response to a first occurrence of a microprocessor event that is one of a plurality of different types of microprocessor events, wherein counters remain unallocated until a first occurrence of microprocessor events for which counters are then allocated.

13. The method according to claim 12, further comprising the steps of:
   encountering an event;
   determining if said event is one of said plurality of microprocessor events;
   determining if one of said plurality of unallocated counters has already been allocated to count events that are said one of said plurality of microprocessor events; and
   in response to a determination that one of said plurality of unallocated counters has not already been allocated to count events that are said one of said plurality of microprocessor events, allocating one of said plurality of counters to count events that are said one of said plurality of microprocessor events.

14. The method according to claim 13, further comprising the step of in response to a determination that one of said plurality of counters has already been allocated to count events that are said one of said plurality of microprocessor events, utilizing said one of said plurality of counters that has already been allocated to count events that are said one of said plurality of microprocessor events.

15. The method according to claim 14, further comprising the steps of:
- generating a list of ones of said plurality of microprocessor events;
- associating a plurality of unallocated counters with said list; and
- dynamically allocating ones of said plurality of unallocated counters to count events that are said ones of said plurality of microprocessor events in response to a first occurrence of an event that is one of said plurality of microprocessor events.

16. A computer program product in a data processing system for dynamically allocating resources for a plurality of different types of events that occur within a microprocessor, said computer program product comprising:
- instruction means for providing a plurality of unallocated resources; and
- instruction means for allocating one of said plurality of unallocated resources only in response to a first occurrence of an event that is one of said plurality of different types of events, wherein resources remain unallocated until a first occurrence of events for which resources are then allocated.

17. The method according to claim 16, further comprising:
- instruction means for encountering an event;
- instruction means for determining if said event is one of said plurality of different types of events;
- instruction means for determining if one of said plurality of unallocated resources has already been allocated for said one of said plurality of different types of events; and
- instruction means for in response to a determination that one of said unallocated resources has not already been allocated for said one of said plurality of different types of events, allocating one of said plurality of unallocated resources for said one of said plurality of different types of events.

18. The product according to claim 17, further comprising instruction means for in response to a determination that one of said unallocated resources has already been allocated for said one of said plurality of different types of events, utilizing one of said plurality of resources that has already been allocated for said one of said plurality of different types of events.

19. The product according to claim 16, further comprising:
- instruction means for generating a list of ones of said plurality of different types of events;
- instruction means for associating a plurality of unallocated resources with said list; and
- instruction means for dynamically allocating ones of said plurality of unallocated resources for said ones of said plurality of different types of events in response to a first occurrence of an event that is one of said plurality of different types of events.

20. The product according to claim 19, further comprising instruction means for varying a length of said list according to a total number of said associated plurality of unallocated resources and a total number of said plurality of different types of events.

21. The product according to claim 20, further comprising instruction means for adding a delimiter as a last field in said list to indicate an end of said list.

22. The product according to claim 19, further comprising instruction means for including a quantity field in said list, said quantity field including an indication of a total number of said plurality of unallocated resources that are associated with said list.

23. The product according to claim 19, further comprising instruction means for including a plurality of fields in said list, each one of said plurality of fields being associated with a different one of said plurality of unallocated resources that are associated with said list, a total number of said plurality of fields being equal to a total number of said plurality of unallocated resources that are associated with said list.

24. The product according to claim 23, further comprising instruction means for storing an identifier in a field associated with one of said plurality of resources when said one of said plurality of resources is allocated, said identifier indicating one of said plurality of events for which said one of said plurality of resources is allocated.

25. The product according to claim 19, further comprising instruction means for including a plurality of different event indicators in said list, each one of said plurality of different event indicators indicating a different one of said plurality of events.

26. The product according to claim 19, further comprising instruction means for storing said list.

27. The product according to claim 16, further comprising:
- instruction means for providing a plurality of unallocated counters; and
- instruction means for allocating one of said plurality of unallocated counters only in response to a first occurrence of a microprocessor event that is one of a plurality of different types of microprocessor events, wherein counters remain unallocated until a first occurrence of microprocessor events for which counters are then allocated.

28. The product according to claim 27, further comprising:
- instruction means for encountering an event;
- instruction means for determining if said event is one of said plurality of microprocessor events;
- instruction means for determining if one of said plurality of unallocated counters has already been allocated to count events that are said one of said plurality of microprocessor events; and
- instruction means for in response to a determination that one of said plurality of unallocated counters has not already been allocated to count events that are said one of said plurality of microprocessor events, allocating one of said plurality of counters to count events that are said one of said plurality of microprocessor events.

29. The product according to claim 28, further comprising instruction means for in response to a determination that one of said plurality of counters has already been allocated to count events that are said one of said plurality of microprocessor events, utilizing said one of said plurality of counters that has already been allocated to count events that are said one of said plurality of microprocessor events.

30. The product according to claim 29, further comprising:
- instruction means for generating a list of ones of said plurality of microprocessor events;
- instruction means for associating a plurality of unallocated counters with said list; and
- instruction means for dynamically allocating ones of said plurality of unallocated counters to count events that are said ones of said plurality of microprocessor events in response to a first occurrence of an event that is one of said plurality of microprocessor events.

31. A data processing system for dynamically allocating resources for a plurality of different types of events that occur within a microprocessor, comprising:

a plurality of unallocated resources; and said data processing system including a CPU executing code for allocating one of said plurality of unallocated resources only in response to a first occurrence of an event that is one of said plurality of different types of events, wherein resources remain unallocated until a first occurrence of events for which resources are then allocated.

32. The system according to claim 31, further comprising:

an event;

said CPU executing code for determining if said event is one of said plurality of different types of events;

said CPU executing code for determining if one of said plurality of unallocated resources has already been allocated for said one of said plurality of different types of events; and in response to a determination that one of said unallocated resources has not already been allocated for said one of said plurality of different types of events, one of said plurality of unallocated resources being allocated for said one of said plurality of different types of events.

33. The system according to claim 32, further comprising said CPU executing code for in response to a determination that one of said unallocated resources has already been allocated for said one of said plurality of different types of events, utilizing one of said plurality of resources that has already been allocated for said one of said plurality of different types of events.

34. The system according to claim 31, further comprising:

a list being generated of ones of said plurality of different types of events;

a plurality of unallocated resources being associated with said list; and ones of said plurality of unallocated resources being dynamically allocated for said ones of said plurality of different types of events in response to a first occurrence of an event that is one of said plurality of different types of events.

35. The system according to claim 34, further comprising a length of said list being varied according to a total number of said associated plurality of unallocated resources and a total number of said plurality of different types of events.

36. The system according to claim 35, further comprising a delimiter included as a last field in said list to indicate an end of said list.

37. The system according to claim 34, further comprising a quantity field being included in said list, said quantity field including an indication of a total number of said plurality of unallocated resources that are associated with said list.

38. The system according to claim 34, further comprising a plurality of fields being included in said list, each one of said plurality of fields being associated with a different one of said plurality of unallocated resources that are associated with said list, a total number of said plurality of fields being equal to a total number of said plurality of unallocated resources that are associated with said list.

39. The system according to claim 38, further comprising an identifier being stored in a field associated with one of said plurality of resources when said one of said plurality of resources is allocated, said identifier indicating one of said plurality of events for which said one of said plurality of resources is allocated.

40. The system according to claim 34, further comprising a plurality of different event indicators being included in said list, each one of said plurality of different event indicators indicating a different one of said plurality of events.

41. The system according to claim 34, further comprising said list being stored.

42. The system according to claim 31, further comprising:

a plurality of unallocated counters; and one of said plurality of unallocated counters being allocated only in response to a first occurrence of a microprocessor event that is one of a plurality of different types of microprocessor events, wherein counters remain unallocated until a first occurrence of microprocessor events for which counters are then allocated.

43. The system according to claim 42, further comprising:

an event;

said CPU executing code for determining if said event is one of said plurality of microprocessor events;

said CPU executing code for determining if one of said plurality of unallocated counters has already been allocated to count events that are said one of said plurality of microprocessor events; and in response to a determination that one of said plurality of unallocated counters has not already been allocated to count events that are said one of said plurality of microprocessor events, one of said plurality of counters being allocated to count events that are said one of said plurality of microprocessor events.

44. The system according to claim 43, further comprising in response to a determination that one of said plurality of counters has already been allocated to count events that are said one of said plurality of microprocessor events, said one of said plurality of counters that has already been allocated being utilized to count events that are said one of said plurality of microprocessor events.

45. The system according to claim 44, further comprising:

a list of ones of said plurality of microprocessor events being generated;

a plurality of unallocated counters being associated with said list; and ones of said plurality of unallocated counters being dynamically allocated to count events that are said ones of said plurality of microprocessor events in response to a first occurrence of an event that is one of said plurality of microprocessor events.

* * * * *